C. R. SCHMIDT.
PIPE CONNECTION FOR WATER CLOSET BOWLS.

No. 556,215.   Patented Mar. 10, 1896.

Witnesses:
J. B. McGirr
May H. Corbett

Inventor
Charles R. Schmidt
by
Connolly Bros.
Attys

UNITED STATES PATENT OFFICE.

CHARLES R. SCHMIDT, OF BALTIMORE, MARYLAND.

PIPE CONNECTION FOR WATER-CLOSET BOWLS.

SPECIFICATION forming part of Letters Patent No. 556,215, dated March 10, 1896.

Application filed June 7, 1894. Serial No. 513,792. (No model.)

*To all whom it may concern:*

Be it known that I, CHARLES R. SCHMIDT, a citizen of the United States, residing at Baltimore, in the State of Maryland, have invented certain new and useful Improvements in Pipe Connections for Water-Closet Bowls; and I do hereby declare the following to be a full, clear, and exact description of the invention, such as will enable others skilled in the art to which it appertains to make and use the same.

My invention has relation to pipe connections for water-closet bowls, and has for its object the provision of novel means for connecting pipes to porcelain or earthenware closet-bowls or similar articles, whereby all danger of injury or breakage of the bowl by accidental movement of the bowl or the pipe may be obviated.

My invention consists in the provision of an elastic bushing of novel construction adapted to be inserted in an opening in the side or bottom of the water-closet bowl or other article to which a pipe is to be attached and to make a tight and at the same time an elastic joint between the pipe and bowl.

My invention further consists in the combination, with an elastic bushing of novel form and construction adapted to be inserted in an aperture in the side or bottom of an earthenware vessel and adapted to surround and embrace a pipe leading into the vessel, of a nut adapted to be screwed upon the end of such bushing and to compress the same so as to cause it to tightly clasp the pipe and form a water-tight and elastic joint.

My invention still further consists in the novel construction, combination, and arrangement of parts hereinafter described and claimed.

Figure 1:
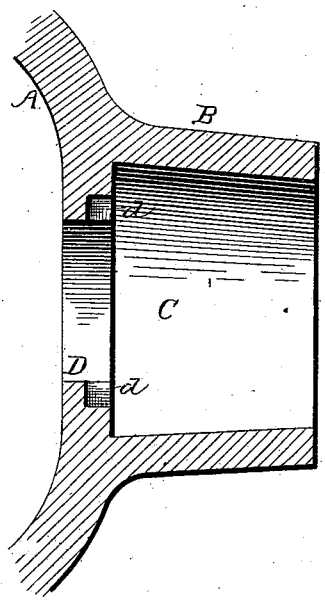
Figure 1:
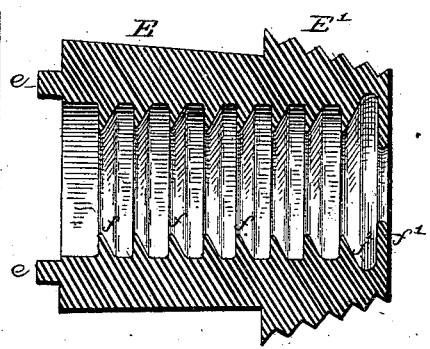
Figure 1:
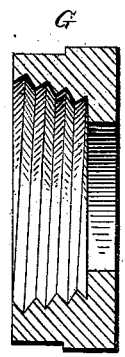
Figure 2:
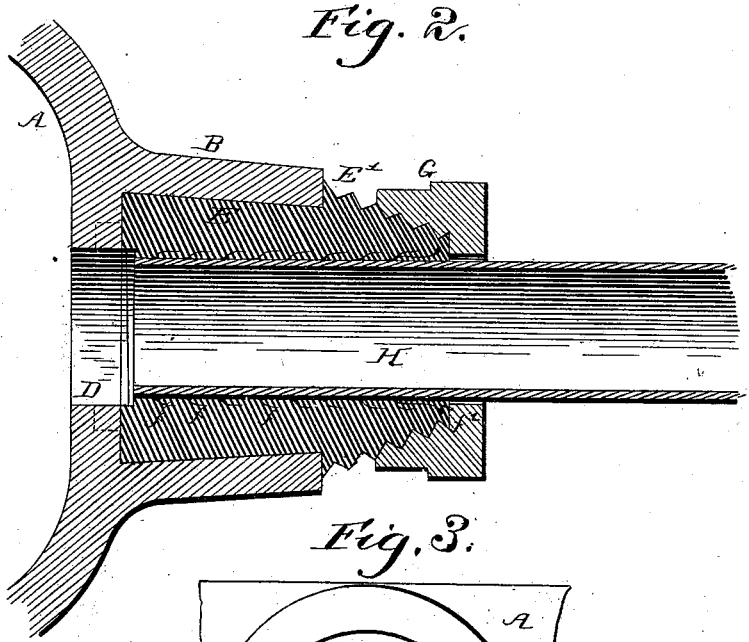
Figure 3:
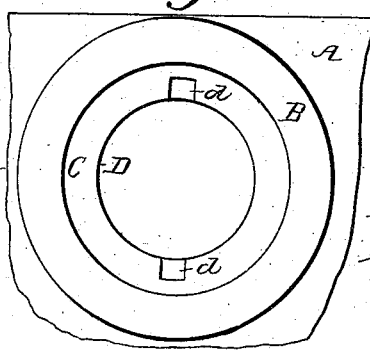

Referring to the accompanying drawings, Figure 1 is a detached sectional view of the several parts of my improved coupling; Fig. 2, a sectional view with the parts joined together; and Fig. 3, a side elevation of a part of the bowl of a water-closet, showing the construction of the boss or spud end to which the coupling is applied.

A designates the bowl of the closet, and B the hollow boss to which the pipe is connected. The opening C in the boss B tapers slightly toward its outer end, and at the inner end of said opening a flange D is formed having notches $d\ d$ which receive lugs $e\ e$ formed on the inner end of an elastic bushing E, the function of the lugs and the notches being to prevent the bushing from turning when seated in the boss.

The bushing E consists of a hollow section of elastic material, such as rubber, and it is tapered to correspond with the tapering form of the opening C in the boss B. The tapering form of the bushing and the corresponding tapering of the opening in the boss are of advantage in maintaining the bushing in the boss after it has been inserted; but these parts may be made cylindrical, if desired.

The interior of the bushing E is serrated or ridged, a number of annular flanges $f\ f\ f$ being formed on the inner surface of the bushing and integral therewith, and these flanges taper slightly, being wider at their bases than at their edges. At the outer end of the bushing a flange $f'$ is formed, preferably somewhat wider than the other flanges in the bushing, and a groove $f^2$ may be formed in the bushing back of the flanges $f'$, so that as this flange is folded back over the next adjacent ones it will necessarily be very tightly compressed, giving additional tightness to the joint at that point.

The outer end of the bushing E is enlarged beyond the outer edge of the boss at E' and tapers inwardly to the end of the bushing, and a coarse screw-thread is formed on the portion E', which receives a nut G, which has a tapered hole screw-threaded to correspond to the screw-thread on the part E'. The screw-threaded hole in the nut G is somewhat smaller at corresponding points than the portion E', so that when the nut is screwed up on the tapered end of the bushing the latter will be compressed inwardly and made to tightly clasp and hold the end H of a pipe which is inserted in the bushing before the nut is tightened up.

When the pipe H is inserted in the bushing E, it pushes inwardly the flanges $f\ f$ and causes them to fold up against the inner wall of the bushing and over one another, as shown in Fig. 2 of the drawings, and holding the pipe firmly in place. When the nut G is screwed up, the outer end of the bushing is so tightly compressed upon and around the pipe that the latter cannot be withdrawn from the bushing.

Having described my invention, I claim—

1. A bushing for pipe connections consisting of an elastic section having internal annular flanges and a tapered and screw-threaded end adapted to receive a nut, substantially as described.

2. The combination with a water-closet bowl having a hollow boss and an elastic bushing fitting in said boss and formed with a screw-threaded end projecting out of the boss and a pipe entering said bushing, of a nut screwing on said projecting end and compressing the same, substantially as described.

3. The combination with a water-closet bowl having a boss with a tapered aperture, of a bushing fitting said aperture and consisting of a tapered section of elastic material having a tapered and screw-threaded end, a pipe projecting into said bushing and a screw-threaded nut having a tapered hole, said nut screwing on the end of the bushing and compressing the same, substantially as described.

In testimony whereof I have affixed my signature in presence of two witnesses.

CHARLES R. SCHMIDT.

Witnesses:
GEO. MCCAFFRAY,
JOS. E. QUINN.